Jan. 3, 1967  E. K. HANSEN  3,295,884
END DOOR STRUCTURE FOR A WAGON BOX
Original Filed Aug. 5, 1964

INVENTOR
ELMER K. HANSEN
BY *Rudolph L. Lowell*
ATTORNEY

United States Patent Office 3,295,884
Patented Jan. 3, 1967

3,295,884
END DOOR STRUCTURE FOR A WAGON BOX
Elmer K. Hansen, 801 S. Martha,
Sioux City, Iowa 51106
Original application Aug. 5, 1964, Ser. No. 387,664.
Divided and this application Apr. 26, 1965, Ser. No. 459,973
2 Claims. (Cl. 296—52)

This application is a division of application Serial No. 387,664, filed August 5, 1964.

This invention relates to bulk material handling apparatus and more particularly to an end door structure for closing an opening in the rear wall of a wagon box.

The object of this invention is to provide an improved self-unloading wagon which discharges bulk material laterally at its forward end.

Yet another object of the invention is to provide a wagon box with a grain tight rear end door, which is readily removable from and easily assembled with the box.

Further objects, features and advantages of this invention will become apparent from the following description and accompanying drawing in which.

Figure 1:
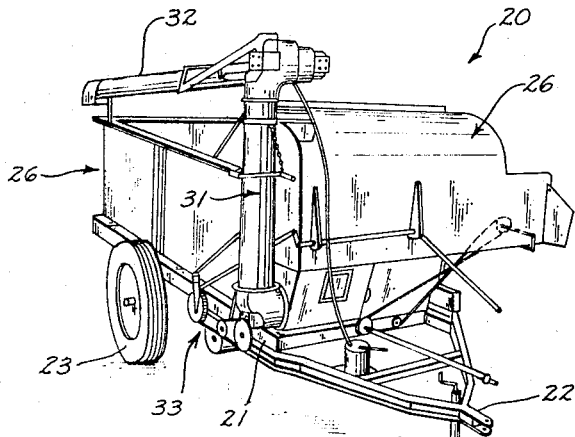
FIG. 1 is a perspective view of a self-unloading bulk material wagon which includes the end door structure of this invention.

Referring to FIG. 1 of the drawing, the door structure 46 of this invention is illustrated with a self-unloading vehicle, indicated generally at 20, having a trailer type wagon which in use is towed behind a tractor and comprises a rectangular-shaped frame 21 secured to a forwardly extended tongue 22. A wheel and axle assembly 23 supports the frame 21 for travel over the ground 24.

An open top box 26 mounted on the frame 21 defines a storage chamber for bulk material to be transported and unloaded by the wagon. The bulk material is unloaded by the action of a horizontal conveyer 27 and an elevator conveyer 28 (FIG. 2) which are operably positioned in the box 26. The elevator conveyer 28 discharges bulk material into a transverse or cross conveyer 29 which moves the bulk material laterally of the box 26. The transverse conveyer 29 is selectively operable to discharge bulk material in one direction to a position adjacent one side of the wagon or in an opposite direction to an auger assembly 31 (FIG. 1) having a movable boom 32.

The conveyers 27, 28 and 29 together with the auger assembly 31 are operated through a drive mechanism indicated generally at 33 (FIG. 2) coupled to the power take-off drive of the towing tractor.

Figure 4:
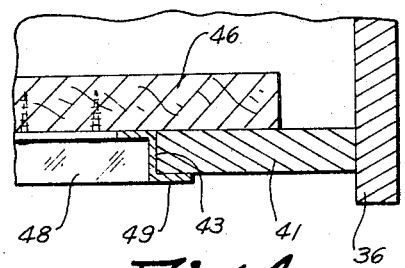
FIG. 4 is an enlarged sectional detail view taken along the line 4—4 of FIG. 3.
Figure 2:
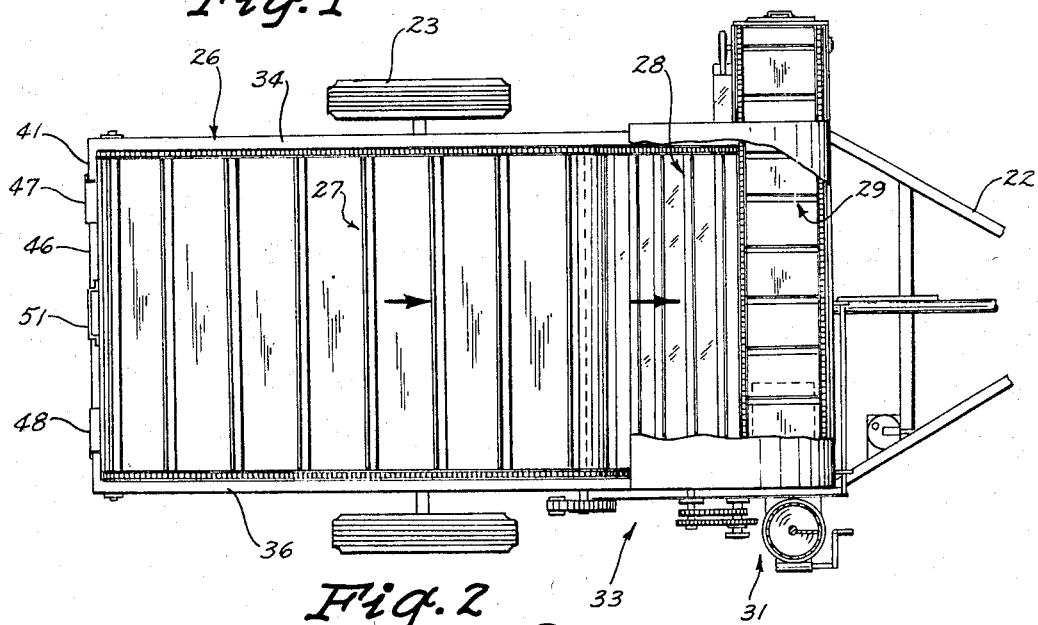
FIG. 2 is an enlarged plan of the wagon of FIG. 1, with portions broken away for clarity.

Referring to FIGS. 2 and 4, the box 26 has upright side walls 34 and 36 secured at their lower edges to a bottom wall (not shown) positioned below the horizontal conveyer 27. An upwardly and forwardly inclined front wall (not shown) is positioned below the elevator conveyer 28 and secured to the side walls 34 and 36. The rear end section of the bottom wall is joined to an upright rear wall 41.

Figure 3:
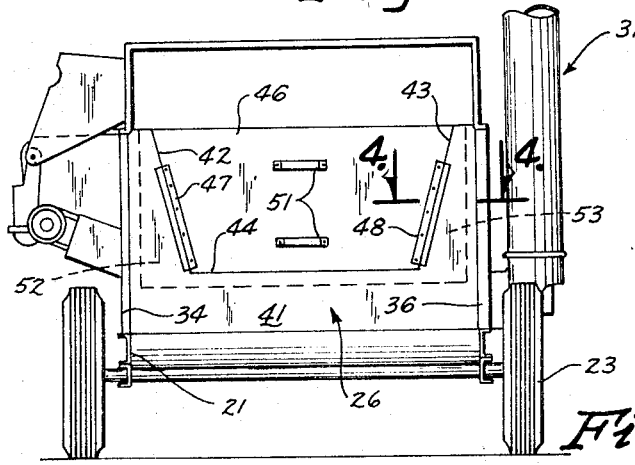
FIG. 3 is an elevational view of the rear end of the wagon.

In order to provide access to the box the rear wall 41 (FIG. 4) has a large trapezoidal-shaped cut out portion or door opening defined by upwardly diverging side walls 42 and 43 and a horizontal bottom wall 44. The opening in the end wall 41 is closed by a flat door or gate 46 adapted to be positioned adjacent to the inside of the rear wall 41 by virtue of the door 46 being of a larger than the opening in the rear wall 41, as shown in dotted lines in FIG. 3, and is releasably attached to the end wall 41 by a pair of Z-shaped guide members 47 and 48 secured to the rear surface of the door 46, and relatively arranged in correspondence with the diverged side walls or edges 42 and 43 of the opening in the rear wall 41 by virtue of the door 46 being of a greater size than the door opening, as clearly appears in FIG. 3, the pressure of the bulk material received within the box and applied against the door is distributed over substantial triangular shaped areas 52 and 53 of the rear wall 41 located at each side of the door opening side edges 42 and 43. As a result the open top end of the door opening may be of a length approximating the width of the rear wall 41 without impairing the stability of the wall 41 to withstand the load pressure applied against the door 46.

The guide members 47 and 48 are identical in construction, and as shown in FIG. 5, for the member 48, each has a flange 49 spaced from the rear surface of the door 46 to form grooves or guideways to receive corresponding sections of the rear wall 41 adjacent the edges 42 and 43 of the door opening. Thus, it is seen that the door 46 may be removed from the rear wall 41 by vertically raising the door 46 until the guide members 47 and 48 are clear of the rear wall 41, after which the door 46 is merely moved laterally inwardly from the rear wall 41. For this purpose handles 51 are secured to the back of the door 46. It is thus unnecessary to vertically lift the door 46 above the rear wall 41 to open or close the door opening.

Although the invention has been described with respect to a preferred embodiment thereof, it is to be understood that it is not to be so limited, since changes can be made therein which are within the full intended scope of this invention as defined by the appended claims.

I claim:
1. A door structure for closing an opening in the rear wall of a wagon box:
    (a) said opening defined by upwardly diverging side edges and a transverse bottom edge,
    (b) a flat door member of a larger size than the opening in the rear wall, said door being of substantially rectangular shape, its sides extending laterally beyond said upwardly diverging side edges and its lower end below said traverse bottom edge of said opening when positioned against the inside of the rear wall for closing the opening therein, and
    (c) upwardly diverging members secured inwardly from the sides of the door member and above the lower end of the door member in a complementary relation relative to the diverging side edges of said opening, said diverging members having guide portions engaged with said diverging edges to attach the door member to the inside of the rear end wall.

2. A door structure for closing an opening in the rear wall of a wagon box:
    (a) said opening defined by upwardly diverging edges joined with a transverse edge,
    (b) door means of a rectangular shape positionable against the inside of the rear wall for closing the opening therein, said door means being of a larger size than said opening and having the sides thereof extending laterally beyond said upwardly diverging edges and its lower end below said transverse bottom edge of said opening when so positioned, and
    (c) upwardly diverging members secured to the door means inwardly from the sides and above the lower end thereof, said members being positioned in a complementary relation relative to the diverging edges and engaged with the rear wall sections adjacent the diverging edges and transverse edge to attach the door means to the rear end wall to close said opening, said diverging members, on lowering of the door means to an opening closing position, coacting with said diverging edges to wedge the door means within an opening.

References Cited by the Examiner

UNITED STATES PATENTS

| | | | |
|---|---|---|---|
| 695,836 | 3/1902 | Rhodes | 49—463 |
| 2,174,197 | 9/1939 | Ryan | 296—51 |
| 2,844,288 | 7/1958 | Crowley | 220—41 |

BENJAMIN HERSH, *Primary Examiner.*

J. H. BRANNEN, *Assistant Examiner.*